(12) United States Patent
Ohmura et al.

(10) Patent No.: US 8,196,793 B2
(45) Date of Patent: Jun. 12, 2012

(54) OPTICAL FIBER CUTTING APPARATUS AND OPTICAL FIBER CUTTING METHOD

(75) Inventors: Masaki Ohmura, Kanagawa (JP);
Kenichiro Ohtsuka, Kanagawa (JP);
Mitsuaki Tamura, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 363 days.

(21) Appl. No.: 12/441,657

(22) PCT Filed: Oct. 4, 2007

(86) PCT No.: PCT/JP2007/069481
§ 371 (c)(1),
(2), (4) Date: Mar. 17, 2009

(87) PCT Pub. No.: WO2008/041748
PCT Pub. Date: Apr. 10, 2008

(65) Prior Publication Data
US 2010/0044406 A1    Feb. 25, 2010

(30) Foreign Application Priority Data
Oct. 4, 2006  (JP) ................. P.2006-273373

(51) Int. Cl.
*B26F 3/00*   (2006.01)
(52) U.S. Cl. .............. 225/2; 225/96.5; 225/103
(58) Field of Classification Search ............. 225/2, 96, 225/96.5, 94, 95, 103–105
See application file for complete search history.

(56) References Cited

U.S. PATENT DOCUMENTS

| | | | | |
|---|---|---|---|---|
| 5,024,363 A * | 6/1991 | Suda et al. | ........... | 225/96.5 |
| 5,838,850 A * | 11/1998 | Mansfield et al. | ........... | 225/96.5 |
| 6,634,079 B1 * | 10/2003 | Kazama | ........... | 29/564.4 |
| 7,070,078 B2 * | 7/2006 | Song | ........... | 225/96.5 |
| 2002/0100356 A1 | 8/2002 | Murakami et al. | | |
| 2006/0201982 A1 | 9/2006 | Yazaki et al. | | |

FOREIGN PATENT DOCUMENTS

| | | |
|---|---|---|
| JP | 55-67139 | 5/1980 |
| JP | 11-264909 | 9/1999 |
| JP | 2002-104838 | 4/2002 |
| JP | 2005-055479 | 3/2005 |
| JP | 2005-096004 | 4/2005 |

* cited by examiner

*Primary Examiner* — Stephen Choi
(74) *Attorney, Agent, or Firm* — McDermott Will & Emery LLP

(57) ABSTRACT

There are provided an optical fiber cutting method and a cutting apparatus which can easily cut a coated optical fiber without a step of removing a coating from the optical fiber. It includes a clamp which holds the coated optical fiber, having a glass fiber and the coating, on both sides of a portion-to-be-cut, a disk-shaped blade member which moves at the portion-to-be-cut in a direction orthogonal to an axis of the optical fiber to cut the coating and to provide a slit into the glass fiber, and a support which presses, with a predetermined pressing force, the portion-to-be-cut from an opposite side of the blade member with respect to the portion-to-be-cut when cutting the coating and providing the slit into the glass fiber. A head of the support is formed with a groove along a sliding direction of the blade member.

7 Claims, 12 Drawing Sheets

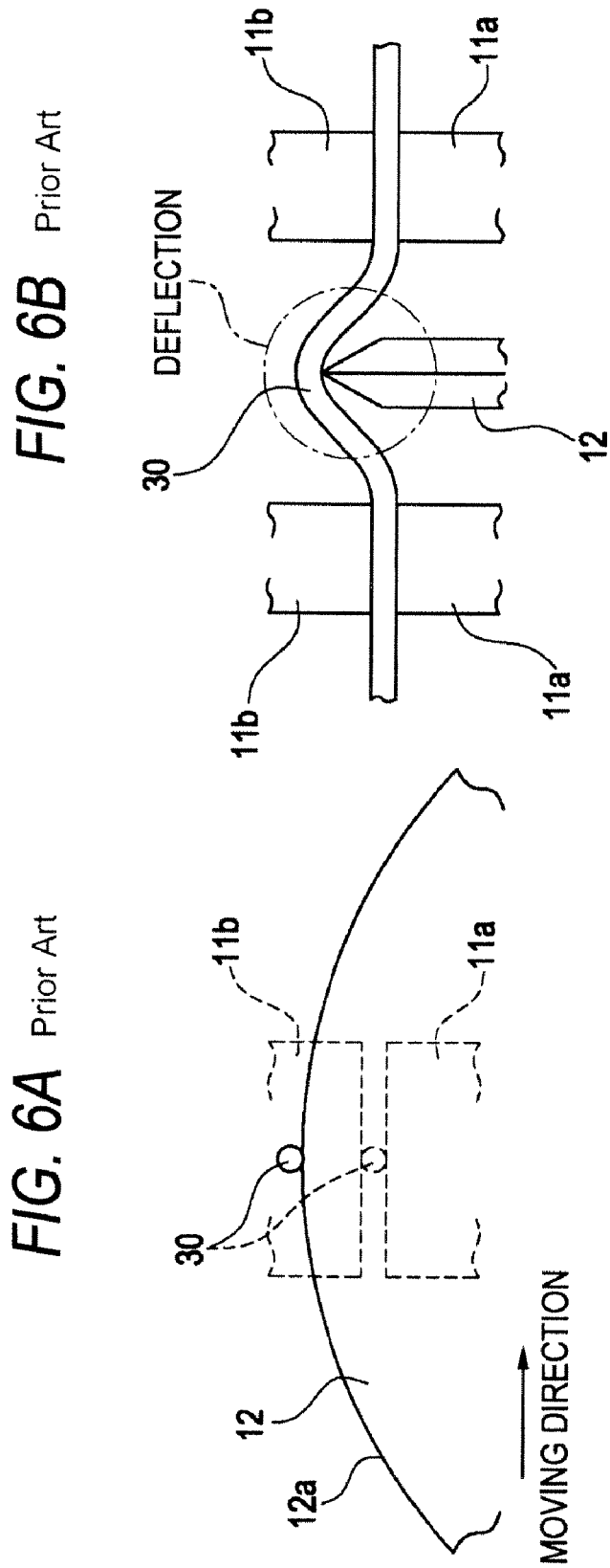

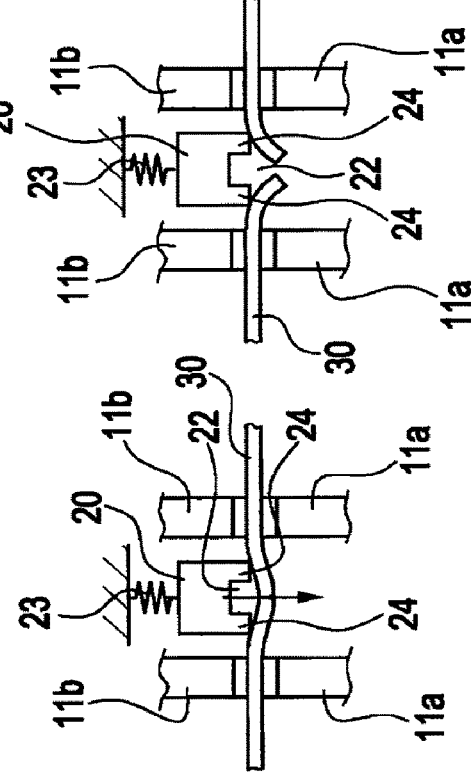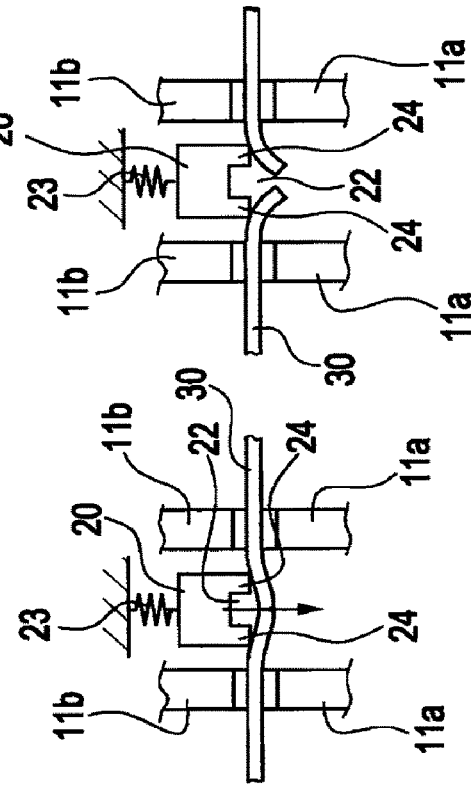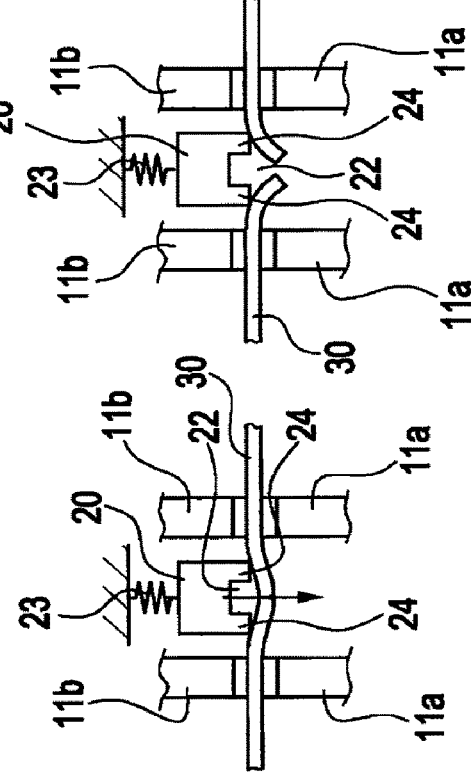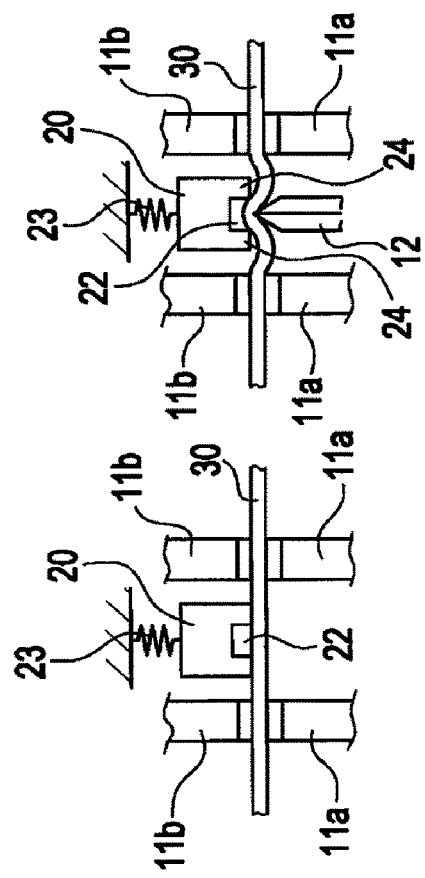

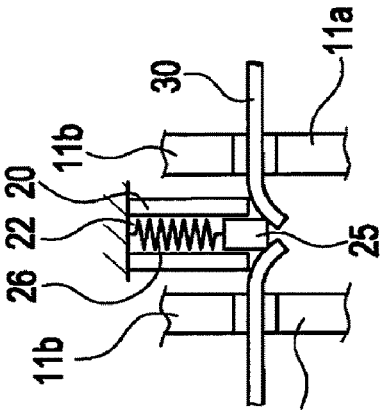
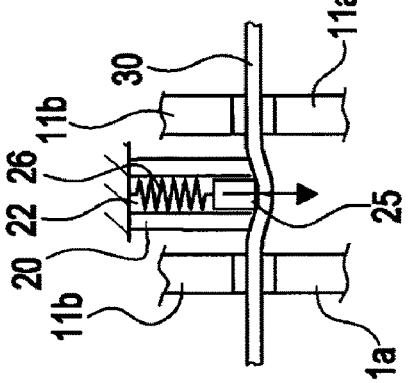
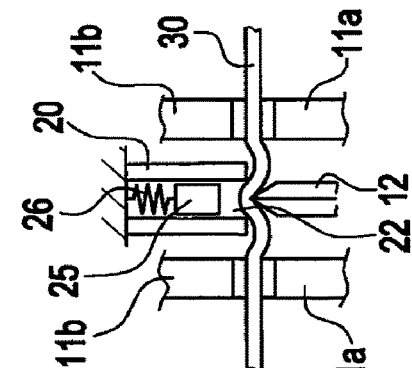
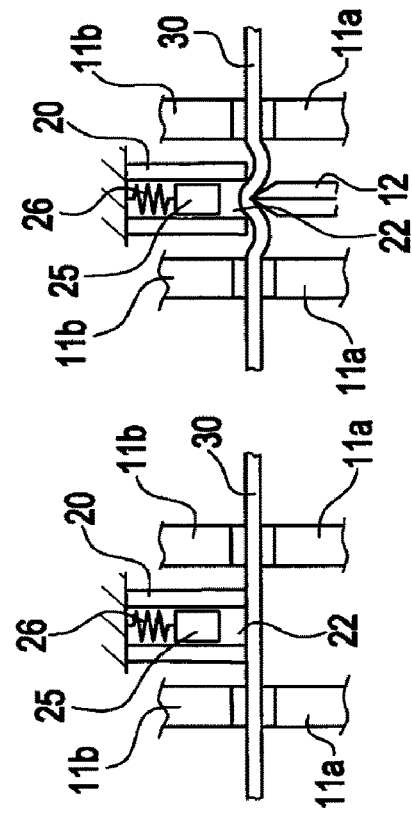

OPTICAL FIBER CUTTING APPARATUS AND OPTICAL FIBER CUTTING METHOD

RELATED APPLICATIONS

This application is the U.S. National Phase under 35 U.S.C. §371 of International Application No. PCT/JP2007/069481, filed on Oct. 4, 2007, which in turn claims the benefit of Japanese Application No. 2006-273373, filed on Oct. 4, 2006, the disclosures of which Applications are incorporated by reference herein.

TECHNICAL FIELD

The present invention relates to an optical fiber cutting apparatus and an optical fiber cutting method for cutting coated optical fibers.

BACKGROUND ART

Conventionally, a cutting apparatus and a cutting method for coated optical fibers, as shown in FIGS. 14A and 14B, are known (see, e.g., Patent Document 1). The optical fiber cutting apparatus 100 includes a blade 101, and pairs of upper and lower clamps 104a, 104b disposed on respective sides of the blade 101 to hold bare fibers 103 of a ribbon 102. Further, on an opposite side of the blade 101 with respect to the bare fibers 103, a support portion 105 is disposed so as to be movable in up-and-down directions.

As shown in FIG. 14A, when cutting the coated optical fibers with this optical fiber cutting apparatus, the bare fibers 103 are held by the respective clamps 104a, 104b, 104a, 104b, and then, a slit is formed on a surface of each of the bare fibers 103 by moving the blade 101 in a direction orthogonal to a longitudinal direction of the bare fibers 103 (i.e., a direction from a front side to a rear side of the drawing sheet). Further, as shown in FIG. 14B, the support portion 105 is moved in a downward direction in the drawing to apply an external force on the bare fibers 103 with the slits being on the outer side, whereby the bare fibers 103 are cleaved.

Patent Document 1: Japanese Unexamined Patent Publication: JP 11-264909 A (FIG. 4, FIG. 6)

According to the optical fiber cutting apparatus and the cutting method as described in Patent Document 1, when cutting the coated optical fibers, generally, glass fibers are cut by a special cutter after removing the coatings with a coating remover. Core diameters of the optical fibers are small, which is φ10 μm in a single mode and φ50-62.5 μm in a multi mode. Therefore, in order to reduce connection loss, positioning accuracy of micrometer order is required. However, with the coatings, it is difficult to ensure positioning accuracy due to deformation and thickness deviation of the coatings. Further, since a condition of a cut end face affects the connection loss, it is required to perform mirror finishing with a special tool, which is an onerous work.

In recent years, coated optical fibers are sometimes being cut without removing the coatings, complying with a demand to simplify optical connections. When cutting the coated optical fibers with the existing cutter, firstly, it is necessary to form a cut into each of the coatings before forming a slit on the surface of each of the glass fibers. However, when trying to cut the coatings in a state shown in FIG. 14A, clamping the respective sides of the coated optical fibers with the two pairs of clamps 104a, 104b, 104a, 104b does not provide enough resisting force so that the coated optical fibers move away from the blade 101. Therefore, the slits cannot be formed on the surfaces of the glass fibers. Further, in order to have the cleaved faces of the glass fibers to be mirrored faces, it is necessary to apply an appropriate tension to the optical fibers. Thus, a clamping force cannot be increased indiscreetly to gain the resisting force.

SUMMARY OF THE INVENTION

It is an object of the present invention to provide an optical fiber cutting method and a cutting apparatus which can easily cut a coated optical fiber without a step of removing a coating from the optical fiber.

An optical fiber cutting apparatus according to the present invention, which can solve the problems described above, includes a clamp which holds a coated optical fiber, having a glass fiber and a coating, on both sides of a portion-to-be-cut of the coated optical fiber, a disk-shaped blade member which moves at the portion-to-be-cut in a direction orthogonal to an axis of the optical fiber to cut the coating and to provide a slit into the glass fiber, and a support which presses, with a predetermined pressure, the portion-to-be-cut from an opposite side of the blade member with respect to the portion-to-be-cut when cutting the coating and providing the slit into the glass fiber. A head of the support is formed with a groove along a sliding direction of the blade member.

In the optical fiber cutting apparatus according to the present invention, it is preferable that a width of the groove be 1 mm or more but 5 mm or less.

Further, in the optical fiber cutting apparatus according to the present invention, it is preferable that the support include a sub-support thereinside to push and bend the optical fiber.

Further, in the optical fiber cutting apparatus according to the present invention, it is preferable that the head of the support be formed with another groove which prevents a displacement of the optical fiber.

A optical fiber cutting method according to the present invention, which can solve the problems described above, includes holding a coated optical fiber, including a glass fiber and a coating, on both sides of a portion-to-be-cut of the coated optical fiber using a clamp, moving a disk-shaped blade member at the portion-to-be-cut in a direction orthogonal to an axis of the optical fiber to cut the coating while pressing the optical fiber using a support, providing a slit into the glass fiber, and after providing the slit, pushing and bending the optical fiber toward the blade member to cut the optical fiber. A head of the support is formed with a groove, a width of which being 1 mm or more but 5 mm or less, along a sliding direction of the blade member. The method further includes, after providing the slit into the glass fiber, pushing the optical fiber toward the groove using the blade member with a pushing amount of 50 m or more but 300 μm or less.

According to the optical fiber cutting apparatus and cutting method of the present invention, when cutting the coated optical fiber, the blade member can cut the coating can and further provide the slit into the glass fiber. Therefore, it is possible to easily carry out the cutting operation without a step of removing the coating from the optical fiber. Further, because the glass fiber of the coated optical fiber is not exposed, handling of the optical fiber after cutting becomes easy. Handling of a cutoff fragment also becomes easy because the glass fiber is not exposed from the cutoff fragment.

Further, when cutting the coating of the optical fiber and providing the slit into the glass fiber by sliding the blade member, walls on respective sides of the groove provided on the head of the support which presses the coated optical fiber function similar to the clamps, so that an interval of holding the coated optical fiber can be reduced. Therefore, a bending radius of the coated optical fiber resulting from the pushing of the blade member is made small so that a desirable resisting force can be generated in the coated optical fiber with a small pushing amount, whereby the coating can be cut and an initial slit can be formed into the glass fiber.

Further, when the width of the groove is 1 mm or more but 5 mm or less, and when the pushing amount by the blade member is 50 µm or more but 300 µm or less, the bending radius of the coated optical fiber resulting from the pushing of the blade member is made small. Therefore, even with the small pushing amount, a desirable resisting force can be generated so that the coated optical fiber can be cut and the initial slit can be provided.

BRIEF DESCRIPTION OF THE DRAWINGS

FIG. 6A is an explanatory view illustrating another state in which the blade pressure is increased, and FIG. 6B is an enlarged side view illustrating a deflection of the coated optical fiber.

FIGS. 10A to 10D are explanatory views illustrating respective steps of an optical fiber cutting method using the grooved support.

FIGS. 11A to 11D are explanatory views illustrating respective steps of another optical fiber cutting method with a sub-support being provided inside the support.

EXPLANATION OF REFERENCE NUMERALS AND SIGNS

10 . . . cutting apparatus, 11a, 11b . . . clamps, 12 . . . blade member, 20 . . . support, 22 . . . groove, 25 . . . sub-support, 27 . . . grooves for preventing displacement, 30 . . . coated optical fiber, 31 . . . glass fiber, 31a . . . slit, 32 . . . coating, 32a . . . cut, CT . . . portion-to-be-cut Best Mode for Carrying Out the Invention Hereinafter, embodiments of the present invention will be described in detail with reference to the drawings.

Figure 1:
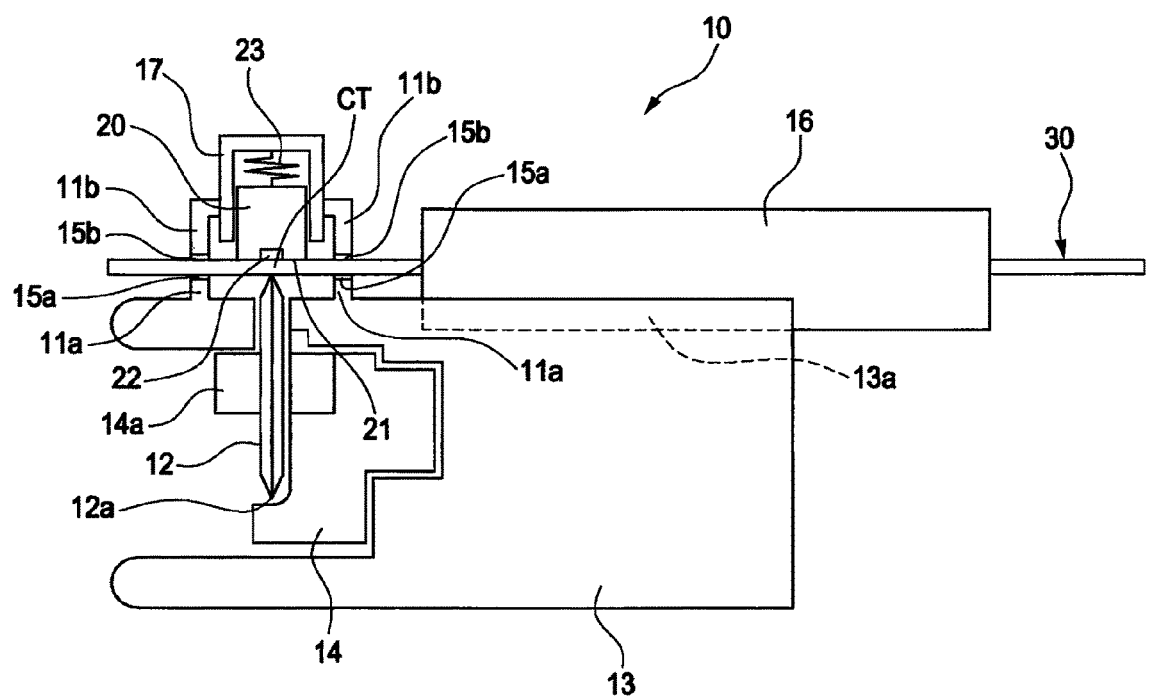
FIG. 1 is a configuration diagram illustrating an embodiment according to an optical fiber cutting apparatus of the present invention.
Figure 2:
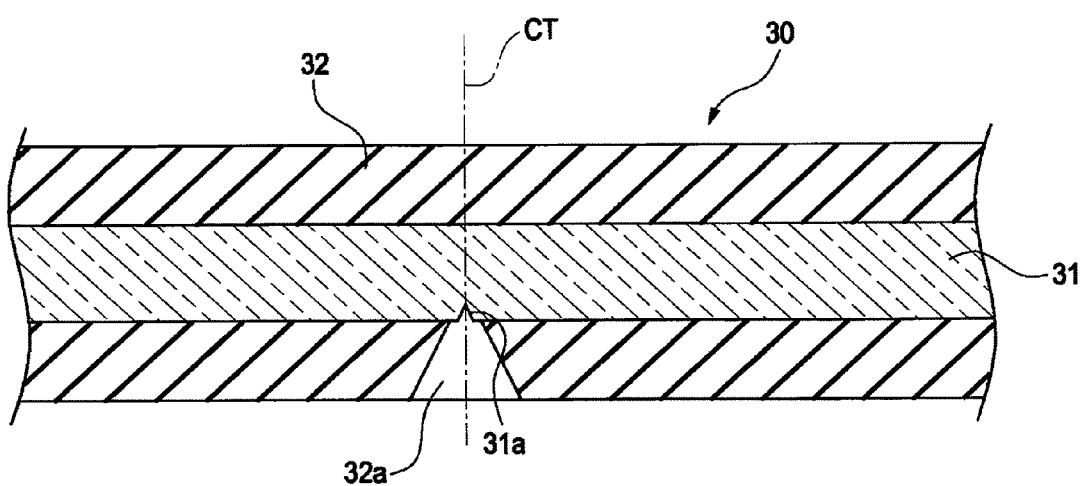
FIG. 2 is a sectional view of a coated optical fiber, illustrating a cut in a coating and a slit in a glass fiber which are provided at a cutting position by a blade member.
Figure 3:
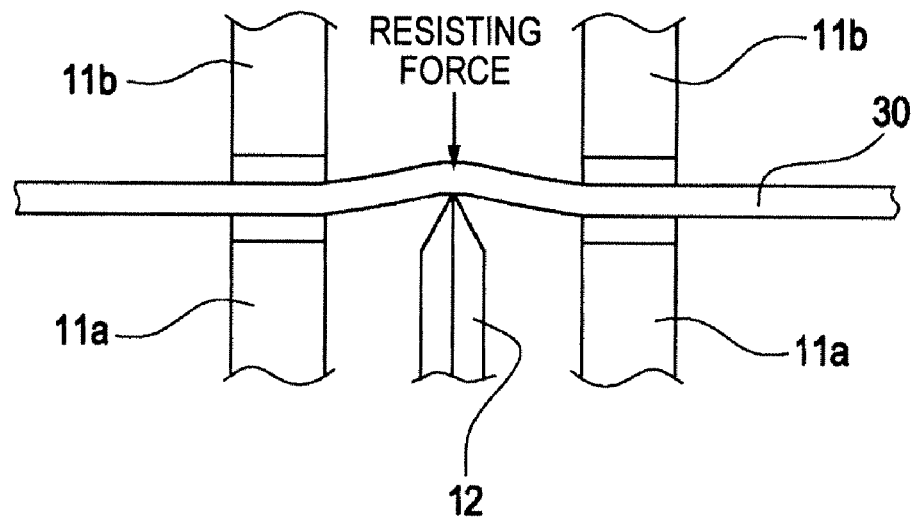
FIG. 3 is an explanatory view illustrating a general cutting method of a coated optical fiber.
Figure 4:
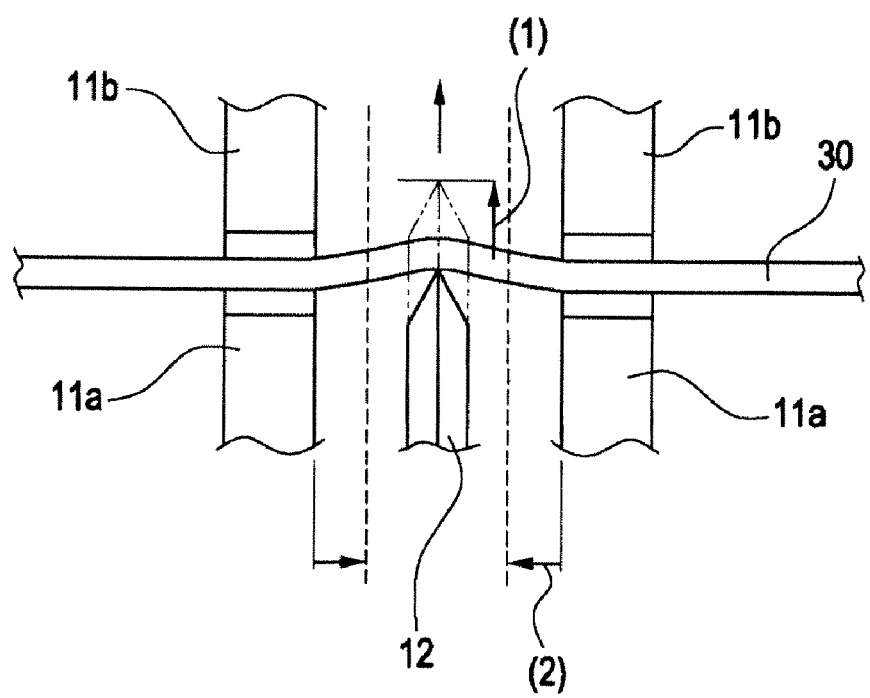
FIG. 4 is an explanatory view illustrating how a resisting force of the coated optical fiber can be increased at the time of cutting.
Figure 5A:
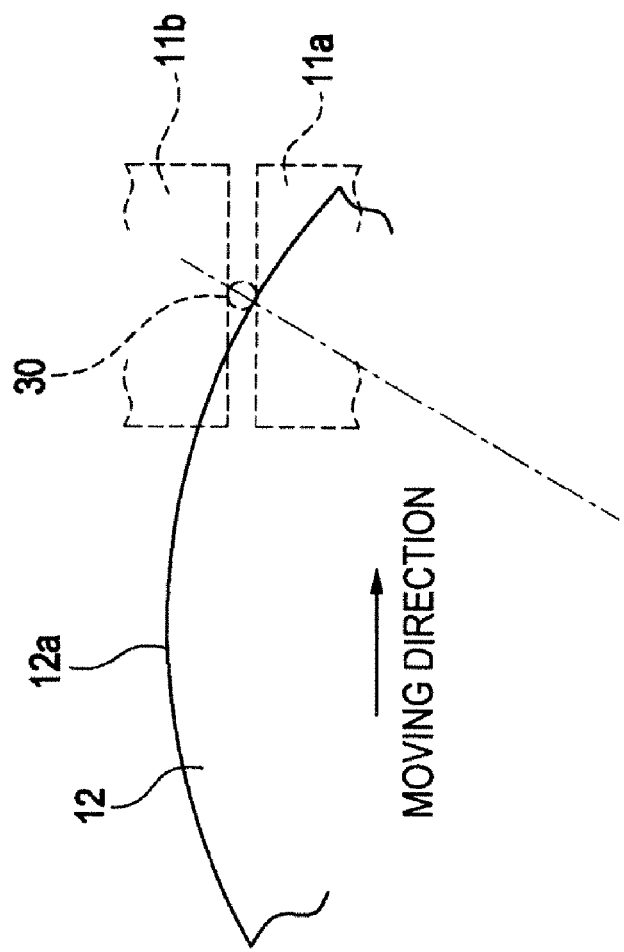
FIG. 5A is an explanatory view illustrating a state in which a blade pressure is increased.
Figure 5B:
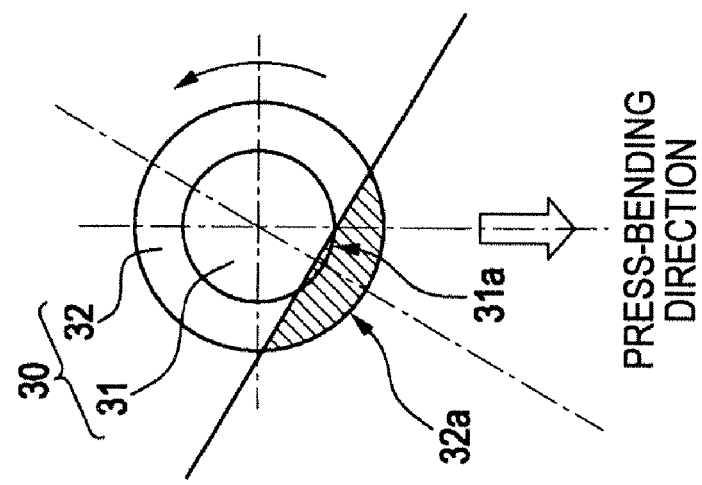
FIG. 5B is an enlarged view of a cut face of the coated optical fiber.
Figure 7:
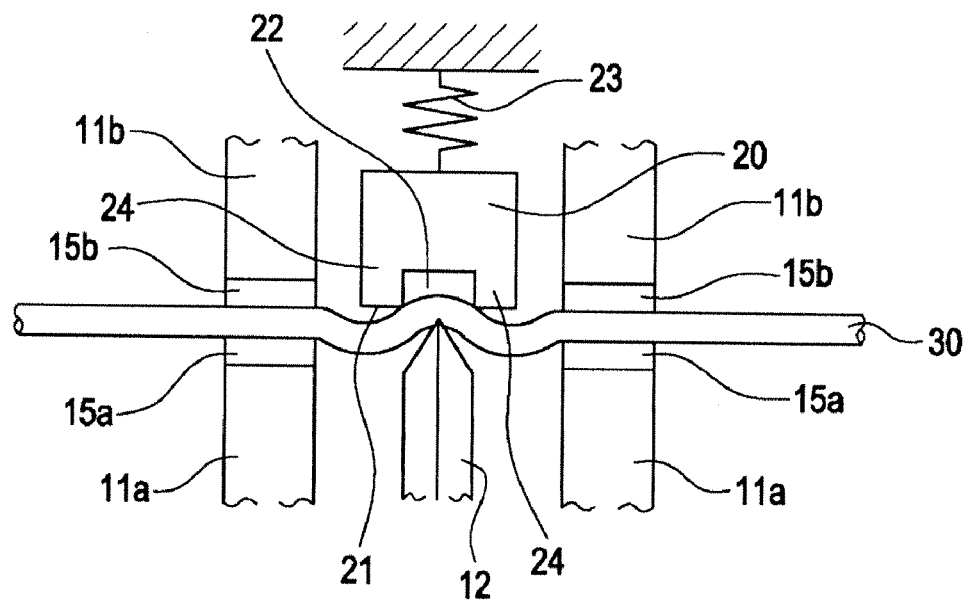
FIG. 7 is an explanatory view illustrating a state in which the coated optical fiber is being pressed by a support when cutting.
Figure 8:
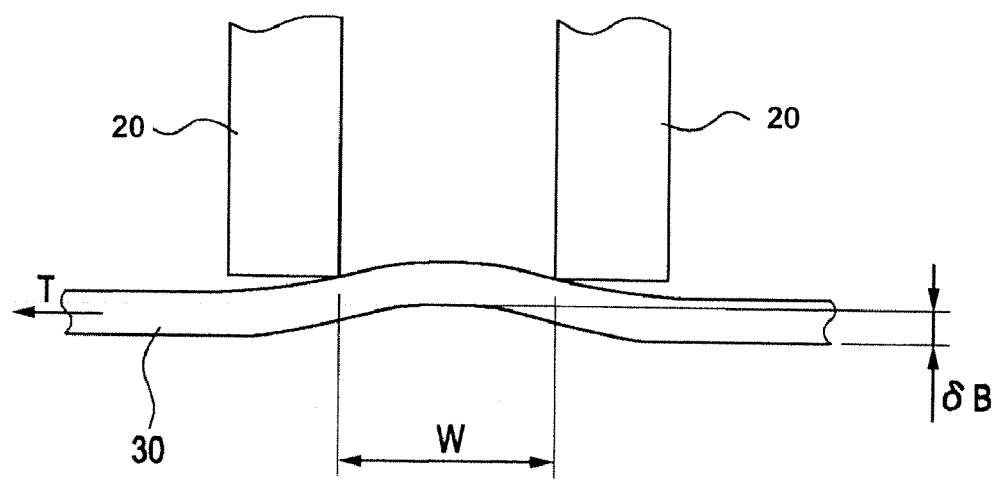
FIG. 8 is an explanatory view of parameters related to the grooved support.
Figure 9:
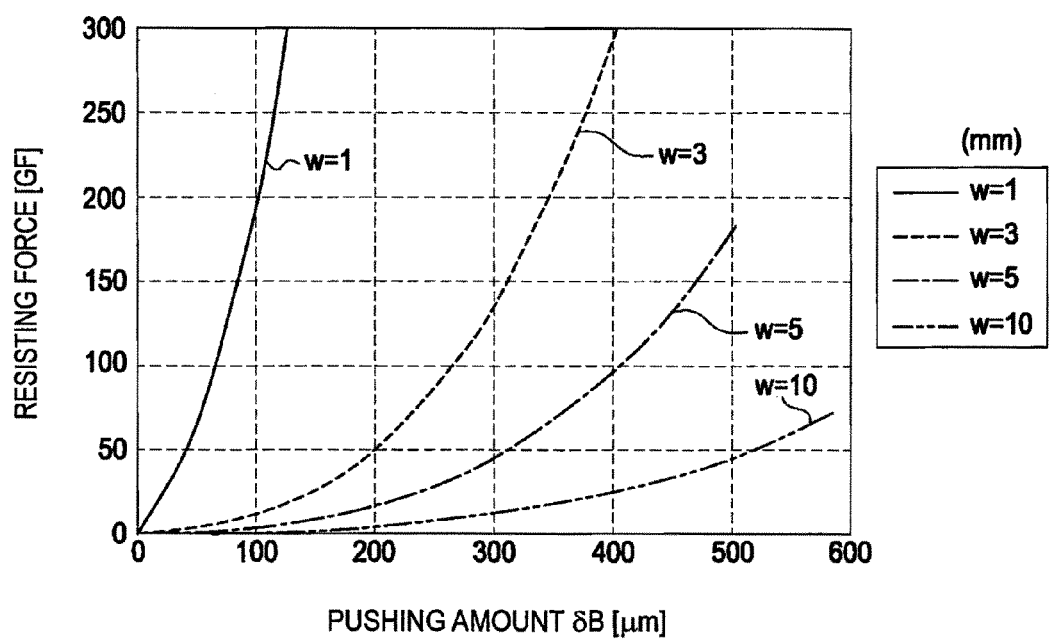
FIG. 9 is a graph showing a relationship between a pushing amount of the coated optical fiber and a load where the parameters are varied.

FIG. 1 is a configuration diagram illustrating an embodiment according to an optical fiber cutting apparatus of the present invention, FIG. 2 is a sectional view of a coated optical fiber, illustrating a cut in a coating and a slit in a glass fiber which are provided at a cutting position by a blade member, FIG. 3 is an explanatory view illustrating a general cutting method of a coated optical fiber, FIG. 4 is an explanatory view illustrating how a resisting force of the coated optical fiber can be increased at the time of cutting, FIG. 5A is an explanatory view illustrating a state in which a blade pressure is increased, FIG. 5B is an enlarged view of a cut face of the coated optical fiber, FIG. 6A is an explanatory view illustrating another state in which the blade pressure is increased, FIG. 6B is an enlarged side view illustrating a deflection of the coated optical fiber, FIG. 7 is an explanatory view illustrating a state in which the coated optical fiber is being pressed by a support when cutting, FIG. 8 is an explanatory view of parameters related to the grooved support, and FIG. 9 is a graph showing a relationship between a pushing amount of the coated optical fiber and a load where the parameters are varied.

As shown in FIG. 1, an optical fiber cutting apparatus 10 of the embodiment includes clamps 11a, 11b which holds a coated optical fiber 30, including a glass fiber 31 (refer to FIG. 2) having a core and a clad and a coating 32 covering an outer periphery of the glass fiber 31, on both sides of a portion-to-be-cut CT, a disk-shaped blade member 12 which moves at the portion-to-be-cut CT in a direction orthogonal to an axis of the coated optical fiber 30 to cut the coating 32 and to provide a slit 31a into the glass fiber 31, and a support 20 which presses, with a predetermined pressure, the portion-to-be-cut CT from an opposite side of the blade member 12 when providing a cut 32a in the coating 32 and the slit 31a into the glass fiber 31. A head 21 of the support 20 is formed with a groove 22 along a sliding direction of the blade member 12.

The cutting apparatus 10 includes a main body 13 having a substantially C-shaped cross section, and a slider 14 which is slidable, with respect to the main body 13 and inside the C-shaped main body 13, in the direction orthogonal to the axis of the coated optical fiber 30 (a direction orthogonal to the drawing sheet). The slider 14 may be manually slid by an operation of a worker, or may be automatically slid by means of an elastic member, such as a spring, or a motor. As shown in FIG. 2, the coated optical fiber 30 includes the glass fiber 31 in the center, and an outer side of the glass fiber 31 is covered with the coating 32. The coated optical fiber 30 of a single core and multiple cores are both applicable.

The disk-shaped blade member 12 is attached to the slider 14 with a fastening member 14a. The blade member 12 is adjustable in up-and-down directions by loosening the fastening member 14a. A blade tip 12a along an outer peripheral edge of the blade member 12 has an acute-angled shape, and with this sharp blade tip 12a, the cut 32a is formed into the coating 32 of the coated optical fiber 30 and the slit 31a is formed into a surface of the glass fiber 31, as shown in FIG. 2. By repeating the operation of providing the cut 32a into the coating 32 and the slit 31a into the surface of the glass fiber 31, the blade tip 12a becomes not acute-angled, that is, cutting performance becomes poor. In such a case, a sharp blade tip 12a can be made to contact the coating 32 and the glass fiber 31 of the coated optical fiber 30 by rotating the blade member 12 with the fastening member 14a being loosened or released.

The blade member 12 may be a round blade made of ultra steel, have a diameter (2R) of 20 mm, and angle of the blade tip 12a be 60°. The tip angle may be in a range from 30° to 90°, and an acute angle (30°) is preferable in order to obtain a fine cut face of the coating (with small deformation).

The lower clamps 11a, 11a are provided on portions of the main body 13 interposing the blade member 12 therebetween to hold the coated optical fiber 30, and lower rubbers 15a, 15a are mounted on upper ends of the lower clamps 11a. The upper clamps 11b, 11b are provided on an upper side of the lower clamps 11a, 11a to be opposed thereto, and the upper clamps 11b, 11b are connected at upper portions thereof to be in an arch-shape. Upper rubber 15b, 15b are attached to lower ends of the upper clamps 11b, 11b, and the upper clamps 11b, 11b are movable in up-and-down directions in FIG. 1. When holding the coated optical fiber 30, the upper clamps 11b, 11b are moved in an upper direction, the coated optical fiber 30 is mounted onto the lower clamps 11a, 11a, and then the upper clamps 11b, 11b are moved in a lower direction to clamp the coated optical fiber 30 with the upper and lower rubbers 15a, 15b. These upper and lower rubbers 15a, 15b firmly hold the coated optical fiber 30 while preventing unnecessary deformation of the coated optical fiber 30.

A guide portion 17 is provided between the front and rear upper clamps 11b, 11b to extend in the up-and-down directions, and the support 20 is disposed in the guide portion 17 so as to be movable in the up-and-down directions. The support 20 is operable to apply side pressure to the coated optical fiber 30 and to apply an external force when cleaving the glass fiber 31. The support 20 is provided at the portion-to-be-cut CT (see FIG. 2), and is biased in the lower direction by a spring 23. That is, the support 20 is opposed to the blade member 12 while interposing the coated optical fiber 30 therebetween.

When cutting a multiple of coated optical fibers 30 using the cutting apparatus 10, as shown in FIG. 3, it is necessary to provide a certain resisting force to the coated optical fibers 30 to prevent the coated optical fibers 30 from floating up. While the coated optical fibers 30 may be externally stressed to provide the resisting force, it is difficult to eliminate unevenness among the respective coated optical fibers 30. Therefore, as for the multiple of optical fibers 30, it is desirable to provide a simple structure which causes each of the coated optical fibers to generate the resisting force thereinside.

As shown in FIG. 4, the following two measures are conceivable to increase the resisting force.

(1) Increase blade pressure (i.e., a distance along which the blade tip 12a of the blade member 12 pushes up the optical fibers 30).

(2) Narrow a clamping interval.

When the blade pressure is increased as indicated by (1), an amount of pushing up the coated optical fiber when introducing the blade increases. Therefore, as shown in FIGS. 5A and 5B, the blade member 12 sidewardly enters the coated optical fiber 30 so that the initial slit 31a may be formed in an inclined direction with respect to a press-bending direction (a downward direction in FIG. 5B). As a result, there is a case in which a smooth cut face cannot be obtained. Further, deformation of the coating 32 may increase due to a torsional force acting on the coated optical fiber 30. Further, as shown in FIGS. 6A and 6B, when the blade member 12 pushes up the coated optical fiber 30, the coated optical fiber 30 is bent between the clamps 11a, 11a (see FIG. 6B), and this is not preferable because a compressive stress may act to a portion of the cut face.

On the other hand, when the interval between the clamps is narrowed as indicated by (2), a bending radius of the coated optical fiber is reduced with the same pushing amount. Therefore, a required resisting force can be obtained with a small blade pressure. However, there is a structural limit of the apparatus in narrowing the interval between the clamps.

Hence, according to the embodiment, the groove 22 is provided on the head 21 of the support 20 as shown in FIG. 7 in order to generate a certain resisting force in the coated optical fiber 30 with a simple structure, without increasing the blade pressure and without narrowing the interval between the clamps. More specifically, the support 20 is a column-like member having, for example, a rectangular cross section, and the head thereof is provided with the groove 22 along the sliding direction of the blade member 12. Therefore, when pressing the coated optical fiber 30, walls 24, 24 on respective sides of the groove 22 function as clamps. Therefore, the clamping interval with respect to the coated optical fiber 30 can easily be narrowed.

As shown in FIG. 8, a width of the groove 22 of the support 20 is denoted by W, and the pushing amount of the optical fiber 30 at the time of cutting is denoted by δB. FIG. 9 shows a relationship between the pushing amount δB and the resistance force F when W is varied. Here, a small-diameter coated (coating/glass fiber=125 μm/80 μm) was used as the optical fiber 30, and clamping provided a tension T=2N. Further, a blade load which can provide a suitable initial slit into the small-diameter coated fiber was around 50 gf. As a result, as shown in FIG. 9, in a case of a standard clamping interval (W=10 mm), the pushing amount δB becomes very large which is 500 μm or more. Further, it can be observed that, as the groove width W of the support 20 is reduced, the pushing amount δB of the coated optical fiber 30 can be made smaller. Although it is desirable to reduce the pushing amount, in view that the deformation of the coating should be as small as possible, an appropriate width W of the groove 22 of the support 20 is 1 or more but 5 mm or less.

According to the optical fiber cutting apparatus and the optical fiber cutting method of the embodiment described above, when forming the cut 32a into the coating 32 of the coated optical fiber 30 and forming the slit 31a into the glass fiber 31 by sliding the blade member 12, the walls 24 on the respective sides of the groove 22 on the head of the support 20 pressing the coated optical fiber 30 act in a manner similar to the clamps 11. Therefore, the clamping interval of the coated optical fiber 30 can be made small. Accordingly, the bending radius of the coated optical fiber 30 resulting from the pushing of the blade member 12 is reduced so that a desirable resisting force can be generated in the coated optical fiber 30 with a small pushing amount, whereby the cut 32a can be formed into the coating 32 and the initial slit 31a can be formed into the glass fiber 31.

First Embodiment

Next, a first embodiment will be explained. FIGS. 10A to 10D illustrate an optical fiber cutting method using the support 20 provided with the groove 22 described above.

First, as shown in FIG. 1OA, the coated optical fiber 30 is held by the clamps 11a, 11b, and the lower face of the support 20 is brought into contact with the coated optical fiber 30. Next, as shown in FIG. 10B, the blade member 12 is slid to form the cut 32a into the coating 32 and to provide the initial slit 31a into the glass fiber 31. At this time, as described above, the walls 24, 24 on the respective sides of the groove 22 of the head 21 of the support 20 holds the coated optical fiber 30 to shorten a substantial clamping interval. Therefore, a desirable resisting force can be obtained even when the pushing amount of the coated optical fiber 30 by the blade member 12 is small. Subsequently, the glass fiber 31 is cleaved by dropping the support 20 as shown in FIG. 10C, whereby the coated optical fiber 30 is cut as shown in FIG. 10D.

Second Embodiment

Next, a second embodiment will be explained. As described above, in order to obtain a smooth mirror face over the entire cut face, starting from the initial slit 31a, it is desirable to rupture along the entire cut face with a tensile stress acting thereon. Therefore, according to this embodiment, a sub-support 25 is provided inside the support 20, inside the groove 22 for example, so as to be movable in up-and-down directions, and is downwardly biased by a spring 26.

FIGS. 11A to 11D illustrate an optical fiber cutting method using the support 20 and the sub-support 25.

First, as shown in FIG. 11A, the coated optical fiber 30 is held by the clamps 11a, 11b, and the lower face of the support 20 is brought into contact with the coated optical fiber 30. At this moment, the sub-support 25 is held on an upper side inside the groove 22, and is not brought into contact with the coated optical fiber 30. Next, as shown in FIG. 11B, the blade member 12 is slid to form the cut 32a into the coating 32 and to provide the initial slit 31a into the glass fiber 31. At this time, as described above, the walls 24, 24 on the respective sides of the groove 22 of the head 21 of the support 20 holds the coated optical fiber 30 so that the substantial clamping interval is shortened. Therefore, the desired resisting force can be obtained even when the pushing amount of the coated optical fiber 30 by the blade member 12 is small. Subsequently, the glass fiber 31 is cleaved by dropping the sub-support 25 as shown in FIG. 11C, whereby the coated optical fiber 30 is cut as shown in FIG. 11D.

Figure 12B:
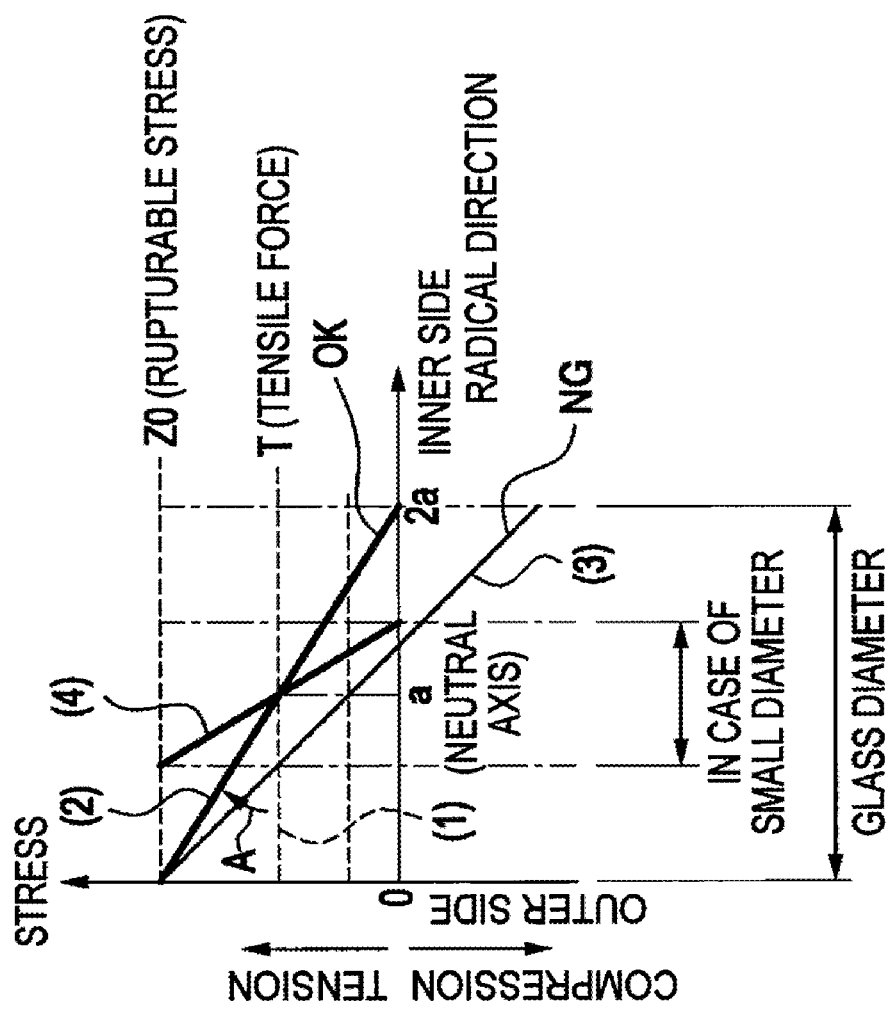
FIG. 12B is a graph showing stress distribution in the glass fiber.
Figure 12A:
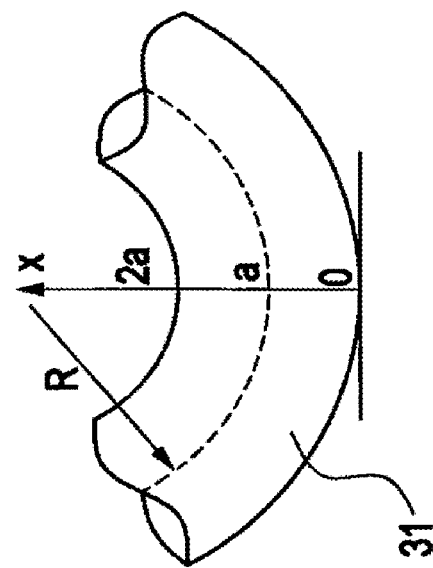
FIG. 12A is an explanatory view illustrating a state in which a glass fiber of the coated optical fiber is bent.

FIGS. 12A and 12B illustrate a stress distribution in the glass fiber 31 of the coated optical fiber 30 when cutting the optical fiber 30 as shown in FIGS. 11A to 11D.

As shown in FIG. 12A, a cross section of the glass fiber 31 of the coated optical fiber 30 has a radius a. Therefore, a neutral axis of the glass fiber 31 is positioned at a distance a from an outer side face. As described above, it is desirable to rupture along the entire cut face with a tensile stress. As shown in FIG. 12B, before bending the coated optical fiber 30, a tensile force T acts substantially uniformly over the entire section of the coated optical fiber 30 ((1) in FIG. 12B). Thus, a constant tensile stress is generated over the entire section.

As the bending the coated optical fiber 30 progresses, an inclination of a stress is generated from an outer side to an inner side of the glass fiber 31 (that is, by rotating around the neutral axis (an arrow A in the drawing)). The glass fiber 31 is cleaved at a time when a stress on the outer side of the glass fiber 31 reaches a rupturable stress (Z0) ((2) in FIG. 12B). At this time, when a compression force is acting on a portion of the section of the glass fiber 31 as shown by (3) in FIG. 12B, a smooth cut face cannot be expected. Further, it is necessary to increase the inclination of the stress as the diameter of the glass fiber 31 becomes smaller ((4) in FIG. 12B). That is, as the diameter of the glass fiber 31 becomes smaller, the coated optical fiber 30 needs to be bent with a smaller radius so that the width of the groove 22 of the support 20 needs to be reduced.

The sub-support 25 moving up and down is further provided inside the groove 22 of the support 20. Therefore, the coated optical fiber can be ruptured from the initial slit 31a with the tensile being applied over the entire cut face by dropping the sub-support 25 after cutting the coating 32 and providing the initial slit 31a into the glass fiber 31 by sliding the blade member 12 while bending the optical fiber 30 by the support 20 with a small bending radius. Accordingly, the smooth mirror face can be obtained over the entire cut face.

Next, a preferable example of the shape of the head of the support 20 will be explained.

Figure 13:
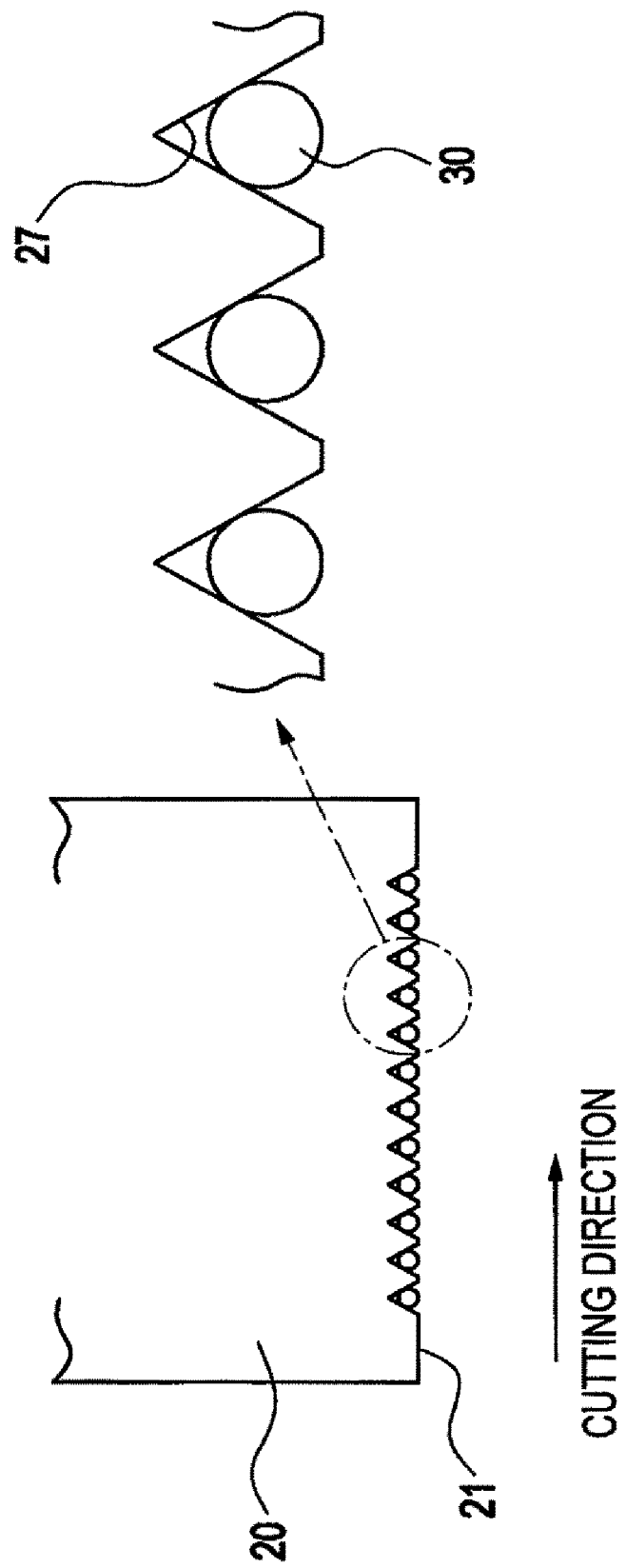
FIG. 13 includes a front view of a support formed with grooves on a head face thereof and an enlarged view of the grooves.
Figure 14A:
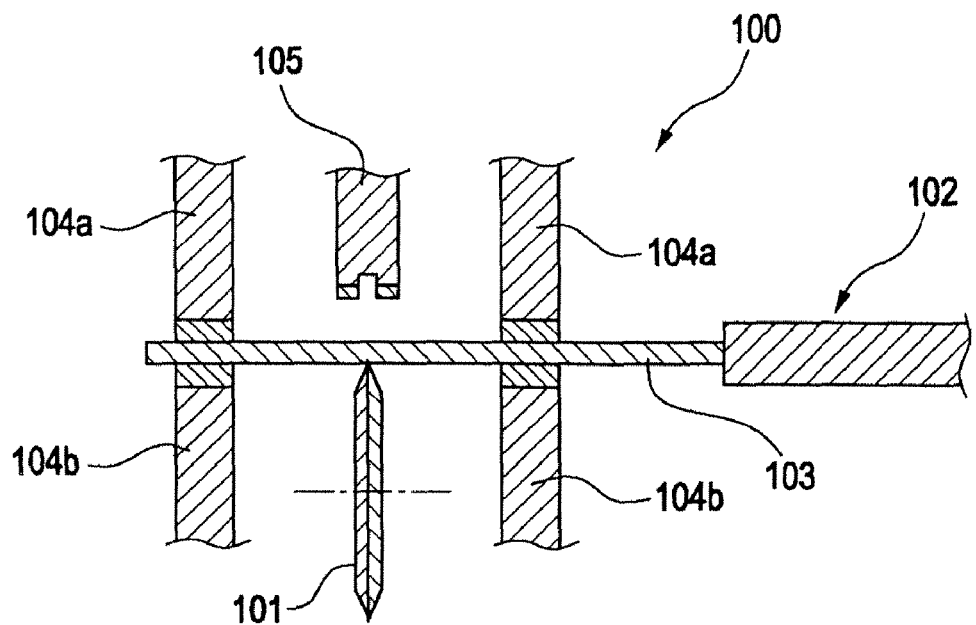
FIG. 14 is a view illustrating steps of a conventional optical fiber cutting method.
Figure 14B:
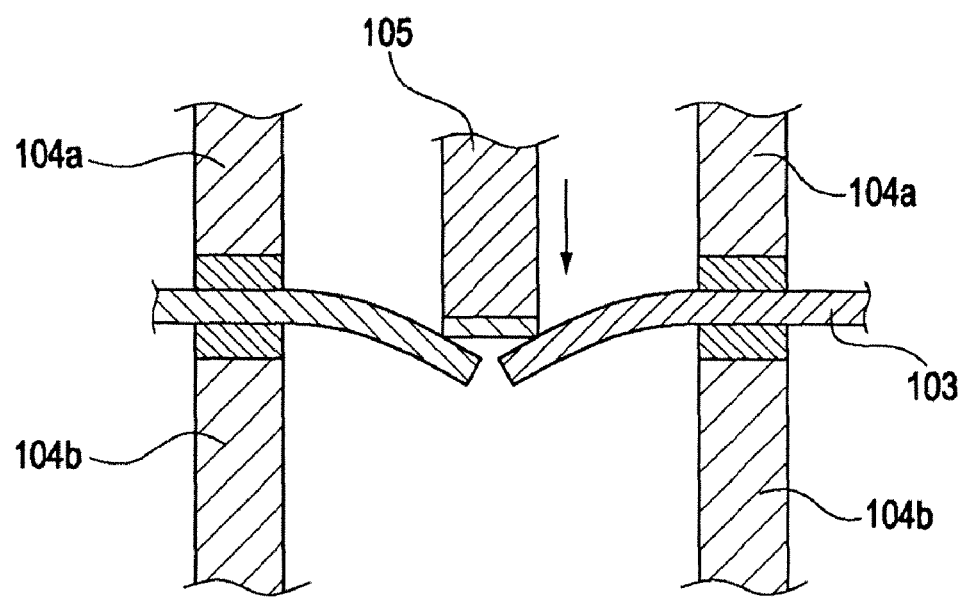

As shown in FIG. 13, the head face 21 of the support 20 is provided with grooves, V grooves 27 for example, which prevents displacement of each of the multiple of coated optical fibers 30. A shape of the V groove 27 is configured such that, when the coated optical fiber 30 is accommodated inside the V groove 27, at least a portion of the glass fiber 31, into the initial slit 31a is to be provided, protrudes downward from the head face 21 of the support 20.

Because the head face 21 of the support 20, which holds the coated optical fibers 30, is formed with the V grooves 27 to prevent the displacement of the coated optical fibers 30, the coated optical fibers 30 can be prevented from moving away in the sliding direction when sliding the blade member 12 to cut the coating 32 and to provide the initial slit 31a into the glass fiber 31.

According to the optical fiber cutting apparatus and the optical fiber cutting method explained above, the blade member 12 can cut the coating 32 and further form the slit into the glass fiber 31. Therefore, the cutting work can be carried out in a state in which the optical fiber 30 has the coating 32. Further, because the glass fiber 31 of the coated optical fiber 30 does not expose, handling of the optical fiber after cutting becomes easy. Post handling or the like of a cutoff fragment also becomes easy because the glass fiber does not expose from the cutoff fragment.

Further, the walls 24 on the respective sides of the groove 22 on the head of the support 20, which holds the coated optical fiber 30, act in a manner similar to the clamps 11. Therefore, the bending radius of the coated optical fiber resulting from the pushing of the blade member 12 is made small, whereby it is possible to form the cut 32a into the coating 32 and to provide the initial slit 31a into the glass fiber 31 with a small pushing amount.

While description of the present invention has been made in detail with reference to specific embodiments, it is apparent for a person skilled in the art that various changes and modifications can be made without departing from the spirit and scope of the present invention. The present application is based on Japanese Patent Application (Japanese Patent Application No. 2006-273373) filed on Oct. 4, 2006, the content of which is incorporated herein by reference.

The invention claimed is:

1. An optical fiber cutting apparatus comprising:
    a clamp configured to hold a coated optical fiber, including a glass fiber and a coating, on both sides of a portion-to-be-cut of the coated optical fiber;
    a disk-shaped blade member configured to move at the portion-to-be-cut in a direction orthogonal to an axis of the optical fiber to cut the coating and to provide a slit into the glass fiber; and
    a support configured:
        to press the portion-to-be-cut from an opposite side of the blade member with respect to the portion-to-be-cut during cutting the coating and providing the slit into the glass fiber so as to clamp the optical fiber with a shorter clamping interval than the clamp, and
        to further press the portion-to-he-cut after cutting the coating and providing the slit into the glass fiber so as to cut off the optical fiber at the portion-to-be-cut using the pressing of only the support,
    wherein a head of the support is formed with a groove along the direction in which the blade member moves.

2. The optical fiber cutting apparatus according to claim 1, wherein a width of the groove is 1 mm or more but 5 mm or less.

3. The optical fiber cutting apparatus according to claim 1, wherein the support comprises a sub-support thereinside to push and bend the optical fiber.

4. The optical fiber cutting apparatus according to claim 1, wherein the head of the support is further formed with another groove which prevents a displacement of the optical fiber.

5. The optical fiber cutting apparatus according to claim 1, wherein the support is configured to be dropped after cutting the coating and providing the slit into the glass fiber so as to cut off the optical fiber at he portion-to-be-cut.

6. An optical fiber cutting method, the method comprising steps of:
- holding a coated optical fiber, including a glass fiber and a coating, on both sides of a portion-to-be-cut of the coated optical fiber using a clamp;
- moving a disk-shaped blade member at the portion-to-be-cut in a direction orthogonal to an axis of the optical fiber;
- cutting the coating and providing a slit into the glass while pressing the optical fiber using a support; and
- after providing the slit, pushing and bending the optical fiber toward the blade member to cut off the optical fiber by pressing only the support toward the blade member, wherein:
- a head of the support is formed with a groove, a width of which being 1 mm or more but 5 mm or less, along the direction in which the blade member is moved, and
- in the cutting the coating and providing the slit into the glass fiber, the optical fiber is pushed toward the groove by the blade member with a pushing amount of 50 μm or more but 300 μm or less.

7. The optical fiber cutting method according to claim 6, wherein the step of pushing and bending the optical fiber to cut off the optical fiber includes dropping the support after providing the slit.

* * * * *